(12) United States Patent
Canedo

(10) Patent No.: US 9,778,636 B2
(45) Date of Patent: Oct. 3, 2017

(54) METHOD FOR CLASSIFYING AND CORRELATING SIMULATION COMPONENTS TO FUNCTIONAL MODELS

(71) Applicant: Siemens Product Lifecycle Management Software Inc., Plano, TX (US)

(72) Inventor: Arquimedes Martinez Canedo, Princeton, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 650 days.

(21) Appl. No.: 14/456,392

(22) Filed: Aug. 11, 2014

(65) Prior Publication Data

US 2015/0051895 A1 Feb. 19, 2015

Related U.S. Application Data

(60) Provisional application No. 61/865,218, filed on Aug. 13, 2013, provisional application No. 61/865,222, filed on Aug. 13, 2013.

(51) Int. Cl.

| G06F 17/10 | (2006.01) |
|---|---|
| G05B 17/02 | (2006.01) |
| G06F 9/455 | (2006.01) |
| G06F 17/50 | (2006.01) |

(52) U.S. Cl.
CPC ............. *G05B 17/02* (2013.01); *G06F 9/455* (2013.01); *G06F 17/50* (2013.01); *G06F 17/5009* (2013.01); *G06F 9/45504* (2013.01); *Y02T 10/82* (2013.01)

(58) Field of Classification Search
CPC .................................................. G06F 17/5018
USPC ............................................................ 703/2
See application file for complete search history.

(56) References Cited

U.S. PATENT DOCUMENTS

| 5,544,067 | A | 8/1996 | Rostoker et al. |
|---|---|---|---|
| 6,983,793 | B2 | 1/2006 | Zheng et al. |
| 7,055,591 | B2 | 6/2006 | Kang et al. |
| 7,761,267 | B2 * | 7/2010 | Ukyo ................. G06F 17/5009 700/28 |
| 2007/0151287 | A1 | 7/2007 | Yahia et al. |
| 2013/0104589 | A1 | 5/2013 | Lambert |

OTHER PUBLICATIONS

European Search Report dated Feb. 16, 2015, for application No. 14180702.4-1954 / 2838042, 9 pages.

(Continued)

*Primary Examiner* — Andy Ho

(57) ABSTRACT

Methods for classifying and correlating simulation components to functional models. A method includes receiving a simulation component library comprising a plurality of simulation components into a memory of the data processing system, parsing the plurality of simulation components from the simulation component library, analyzing a plurality of extracted functions into a plurality of function graphs for each of the plurality of simulation components, composing an extracted functions graph with the plurality of extracted functions of the plurality of function graphs, and storing the extracted functions graph of the plurality of extracted functions in a components-to-function database.

20 Claims, 13 Drawing Sheets

(56) References Cited

OTHER PUBLICATIONS

Canedo, A., et al. "Context-sensitive Synthesis of Executable Functional Models of Cyber-Physical Systems." ICCPS'13, Apr. 8-11, 2013 Philadelphia, PA, pp. 99-108.
Abelein, U., et al. "Complexity, quality and robustness—the challenges of tomorrow's automotive electronics." Design, Automation Test in Europe Conference, Mar. 12-16, 2012. pp. 870-871.
Aberdeen Group. "System Design: New Product Development for Mechatronics." Jan. 2008. pp. 1-25.
Uckun, S. "Meta II: Formal Co-Verification of Correctness of Large-Scale Cyber-Physical Systems During Design." Palo Alto Research Center, Technical Report, Sep. 2011. pp. 1-43.
Broy, M., et al. "Engineering Automotive Software." Proceedings of the IEEE, vol. 95, No. 2, pp. 356-373, Feb. 2007.
Dumbacher, D.L. and Davis, S.R. "Building Operations Efficiencies into NASA's Ares I Crew Launch Vehicle Design." 54th JANNAF Propulsion Conf., May 2007, 25 pages.
Broy, M., et al. "Automotive Architecture Framework: Towards a Holistic and Standardised System Architecture Description." TUM Tech Report, Jul. 2009, 27 pages.
Bhave, A., et al. "View Consistency in Architectures for Cyber-Physical Systems." Cyber-Physical Systems (ICCPS). Apr. 2011, pp. 151-160.
Dahmus, J.B., et al. "Modular product architecture." Design Studies, vol. 22. No. 5, (2001), pp. 409-424.
Sangiovanni-Vincentelli, A. "Defining platform-based design." EEDesign of EETimes, Feb. 8, 2002, 6 pages.
Sangiovanni-Vincentelli, A., et al. "Taming Dr. Frankenstein: Contract-Based Design for Cyber-Physical Systems." European Journal of Control, vol. 18, No. 3, (2012), pp. 217-238.
McFarland, M.C., et al. "The High-Level Synthesis of Digital Systems." Proceedings of the IEEE, vol. 78, No. 2, Feb. 1990, pp. 301-318.
Harman, P. "The Role of Modelica in a Robust Engineering Process." Proceedings 7th Modelica Conference, Como, Italy, Sep. 20-22, 2009, pp. 637-640.
Hirtz, J., et al. "A Functional Basis for Engineering Design: Reconciling and Evolving Previous Efforts." NIST Technical Note 1447, Feb. 2002, 43 pages.
Erden, M.S. et al. "A review of function modeling: Approaches and applications." Artificial Intelligence for Engineering Design, Analysis and Manufacturing (2008), vol. 22, pp. 147-169.
Chakrabarti, A., et al. "Computer-Based Design Synthesis Research: An Overview." Journal of Computing and Information Science in Engineering, Jun. 2011, vol. 11, pp. 1-10.
Neema, S., et al. "Constraint-Based Design-Space Exploration and Model Synthesis." In Embedded Software, vol. 2855, (2003) pp. 290-305.
Smolek, P., et al. "Exploring the Possibilities of Co-Simulation with CATIA V6 Dynamic Behavior Modeling." In ERK' 2013, pp. 177-180.
FMI PLM Interface- Specifiation for Product Lifecycle Management (PLM) of modeling, simulation and validation information. V1.0. Technical Report, MODELISAR Consortium, Mar. 2011.
Helms, B. "Object-Oriented Graph Grammars for Computational Design Synthesis." PhD. thesis, Technische Universtiat, Munchen. Sep. 2012, 179 pages.
Willems, J.C. "The Behavioral Approach to Open and Interconnected Systems." Control Systems, IEEE, vol. 27, No. 6, Dec. 2007, pp. 46-99.
"AUTOSAR Automotive Open System Architecture." Retrieved from www.autosar.org on Jul. 31, 2014, 2 pages.
LMS Imagine.Lab. Retrieved from www.plm.automation.siemens.com/en_us/products/lms/imagine-lab/index.shtml, Aug. 1, 2014, 3 pages.
"Modelica Association, Modelica." Retrieved from www.modelica.org on Jul. 31, 2014, 2 pages.
MathWorks, "Simscape." Retrieved from www.mathworks.com/simscape on Jul. 31, 2014, 2 pages.
"Modelon—Vehicle Dynamics Library." Retrieved from www.modelon.com/ on Jul. 31, 2014, 2 pages.
MathWorks, "Simulink." Retrieved from www.mathworks.com/simulink on Jul. 31, 2014, 3 pages.
Maplesoft, "MapleSim." Retrieved from www.maplesoft.com on Jul. 31, 2014, 1 page.
National Instruments, "LabVIEW System Design Software." Retrieved from www.ni.com/labview/ on Jul. 31, 2014, 2 pages.
Komoto, H. and Tomiyama, T. "A framework for computer-aided conceptual design and its application to system architecting of mechatronics products." Computer Aided Design, vol. 44, No. 10, pp. 931-946, Oct. 2012.
Charette, R.N., "This car runs on code." IEEE Spectrum, Feb. 2009. Retrieved from http://spectrum.ieee.org/transportation/systems/this-car-runs-on-code on Jul. 31, 2014, 7 pages.
Fantoni, G., et al. "Automatic extraction of function-behaviour-state information from patents." Advanced Engineering Informatics, 27(3), (2013), pp. 317-334.

\* cited by examiner

FIG. 6

```
model Valve "Simple valve"
extends Interfaces.Partials.TwoPort(a(start=0), final tapT=-1);
parameter Boolean LinearCharacteristic (start=true) "Type of characteristic";
parameter Real y1 (min=small, start=1) "Max. valve opening";
parameter Modelica.SIunits.VolumeFlowRate Kv1 (min=small, start=1) "Max. flow @ y = y1";
parameter Real kv0 (min=small, max=1 - small, start=0.01) "Leakage flow / max.flow @ y = 0";
parameter Modelica.SIunits.Pressure dp0 (start=1) "Standard pressure drop";
parameter Modelica.SIunits.Density rho0 (start=10) "Standard medium's density";
parameter Real frictionLoss(min=0, max=-1, start=0) "Part of friction losses fed to medium";
protected
    constant Modelica.SIunits.VolumeFlowRate unitVolumeFlowRate=1;
    constant Real small=Modelica.Constants.small;
    constant Modelica.SIunits.VolumeFlowRate smallVolumeFlowRate=eps*unitVolumeFlowRate;
    constant Real eps=Modelica.Constants.eps;
    Real yLim=max(miny, y1), 0) "Limited valve opening";
    Modelica.SIunits.VolumeFlowRate Kv "Standard flow rate";
public
    Modelica.Blocks.Interfaces.RealInput y ;
initial algorithm
    assert(y1 > small,    "Valve characteristic: y1 has to be > 0 !");
    assert(Kv1 > smallVolumeFlowRate, "Valve characteristic: Kv1 has to be > 0 !");
    assert(kv0 > small,   "Valve characteristic: kv0 has to be > 0 !");
    assert(kv0 < 1 - eps, "Valve characteristic: kv0 has to be < 1 !");
equation
    Kv/Kv1=if LinearCharacteristic then kv0 + (1 - kv0)*yLim/y1 else kv0*exp(Modelica.Math.log(1/kv0)*yLim/y1);
    dp/dp0=medium.rho/rho0*(V_flow/Kv)*abs(V_flow/Kv);
    Q_flow=frictionLoss*V_flow*dp;
end Valve;
```

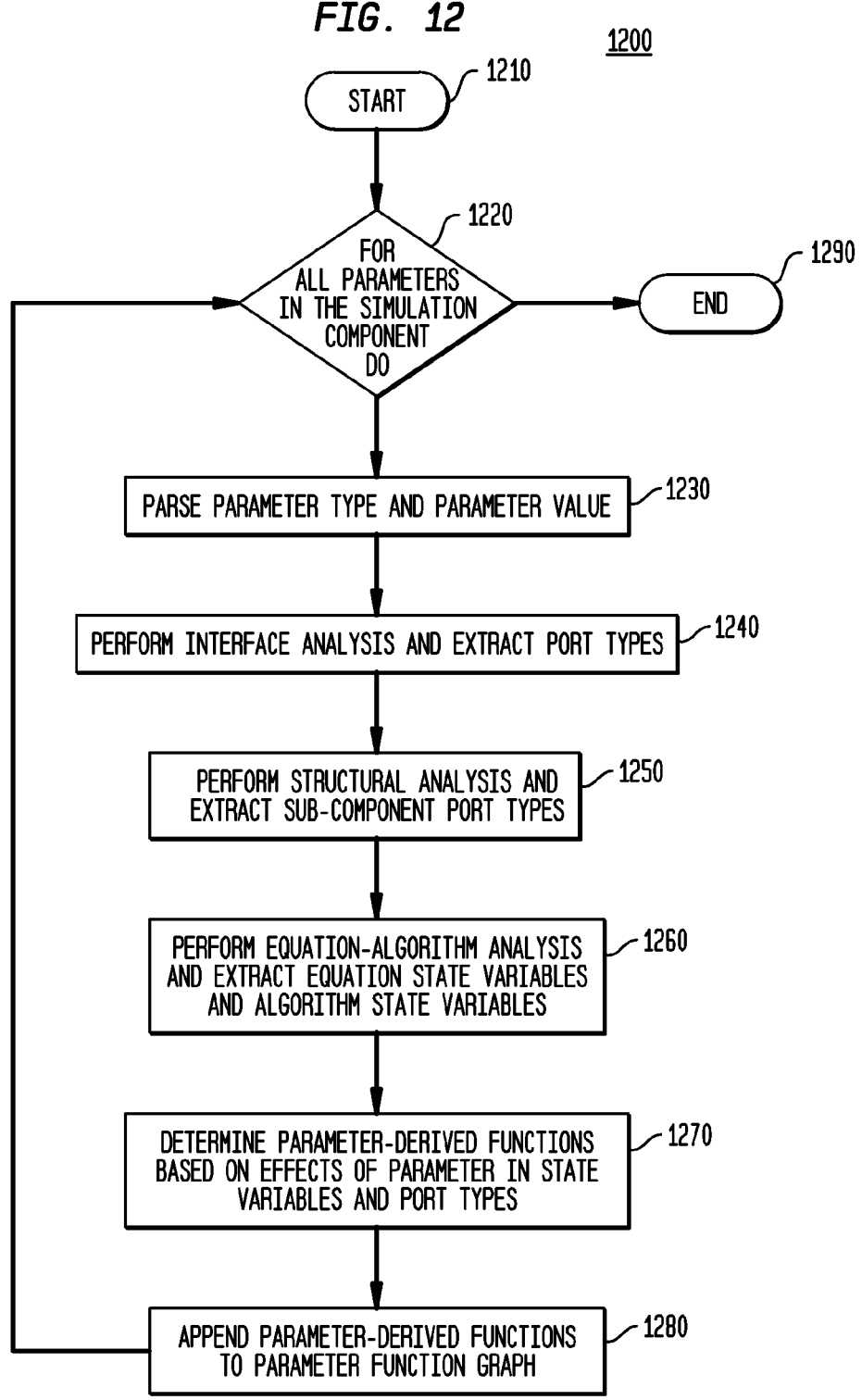

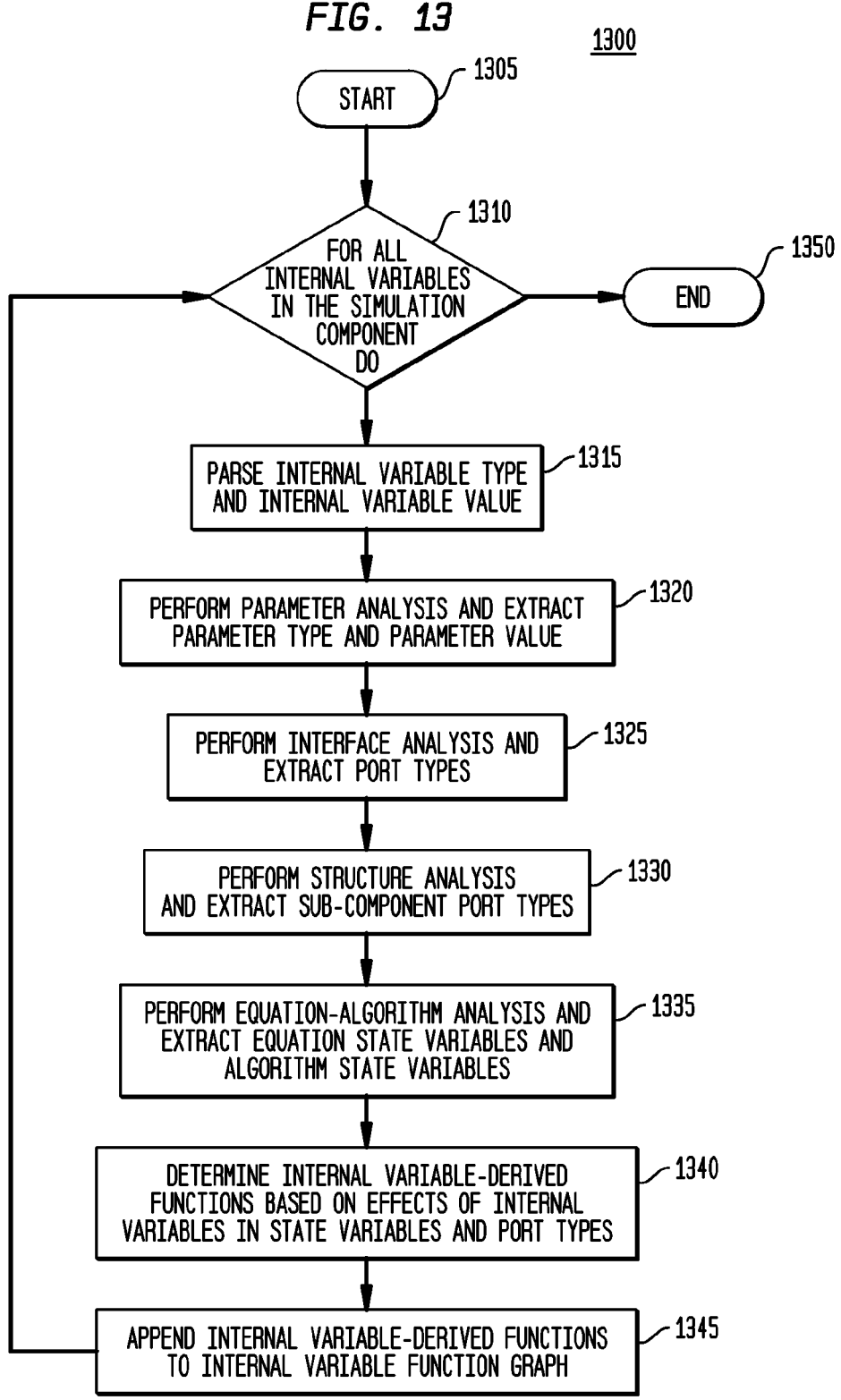

METHOD FOR CLASSIFYING AND CORRELATING SIMULATION COMPONENTS TO FUNCTIONAL MODELS

CROSS-REFERENCE TO OTHER APPLICATION

This application claims the benefit of the filing date of U.S. Provisional Patent Application 61/865,218, filed Aug. 13, 2013, which is hereby incorporated by reference.

This application claims the benefit of the filing date of U.S. Provisional Patent Application 61/865,222, filed Aug. 13, 2013, which is hereby incorporated by reference.

This application shares some subject matter with commonly-assigned, concurrently filed U.S. patent application Ser. No. 14/456,437, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include a method for classifying and correlating simulation components to functional models. The method includes receiving a simulation component library comprising a plurality of simulation components into a memory of the data processing system, parsing the plurality of simulation components from the simulation component library, analyzing a plurality of extracted functions into a plurality of function graphs for each of the plurality of simulation components, composing an extracted function graph with the plurality of extracted functions of the plurality of function graphs, and storing the extracted function graph of the plurality of extracted functions in a database.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates an example of a parameter analysis demonstrating parameters inferring parameter-derived functions in accordance with disclosed embodiments;

FIG. 12 illustrates a flowchart for performing a parameter analysis for each of a plurality of parameters in a simulation component in accordance with disclosed embodiments; and FIG. 13 illustrates a flowchart for performing an internal variables analysis for each of a plurality of internal variables in a simulation component in accordance with disclosed embodiments.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments. Reference numbers are used consistently throughout the description to refer to similar elements in different figures.

Advanced cyber-physical systems (CPS) are some of the most technologically advanced and complex systems currently being produced. Modern cars are no longer mechanically-dominated systems; their physical behavior is greatly influenced by computers (electronic control units or ECUs) and network systems, cyber components. The remarkable advances in fuel economy, safety, performance, etc. have been possible due to the dense array of cooperating cyber components that interact with the physical processes in a car. Designing a modern car with hundreds of ECUs controlling dozens of complex physical processes is a daunting task that requires the collaboration of hundreds of domain experts from various organizations. Creating design automation tools that improve the automotive design process and allow companies to rapidly add new features, manage the heterogeneity of simulation components, and maintaining the development time and cost targets is an equally challenging task.

The disclosed method is for correlating functions in an architecture model to simulation components in 1D simulation models. A process is disclosed to automatically classify libraries of 1D simulation components according to their functionality through a model analysis. Simulation components in simulation component libraries do not contain semantic information related to the set of functions they fulfill and only provide information about the behavior they accomplish.

Figure 1:
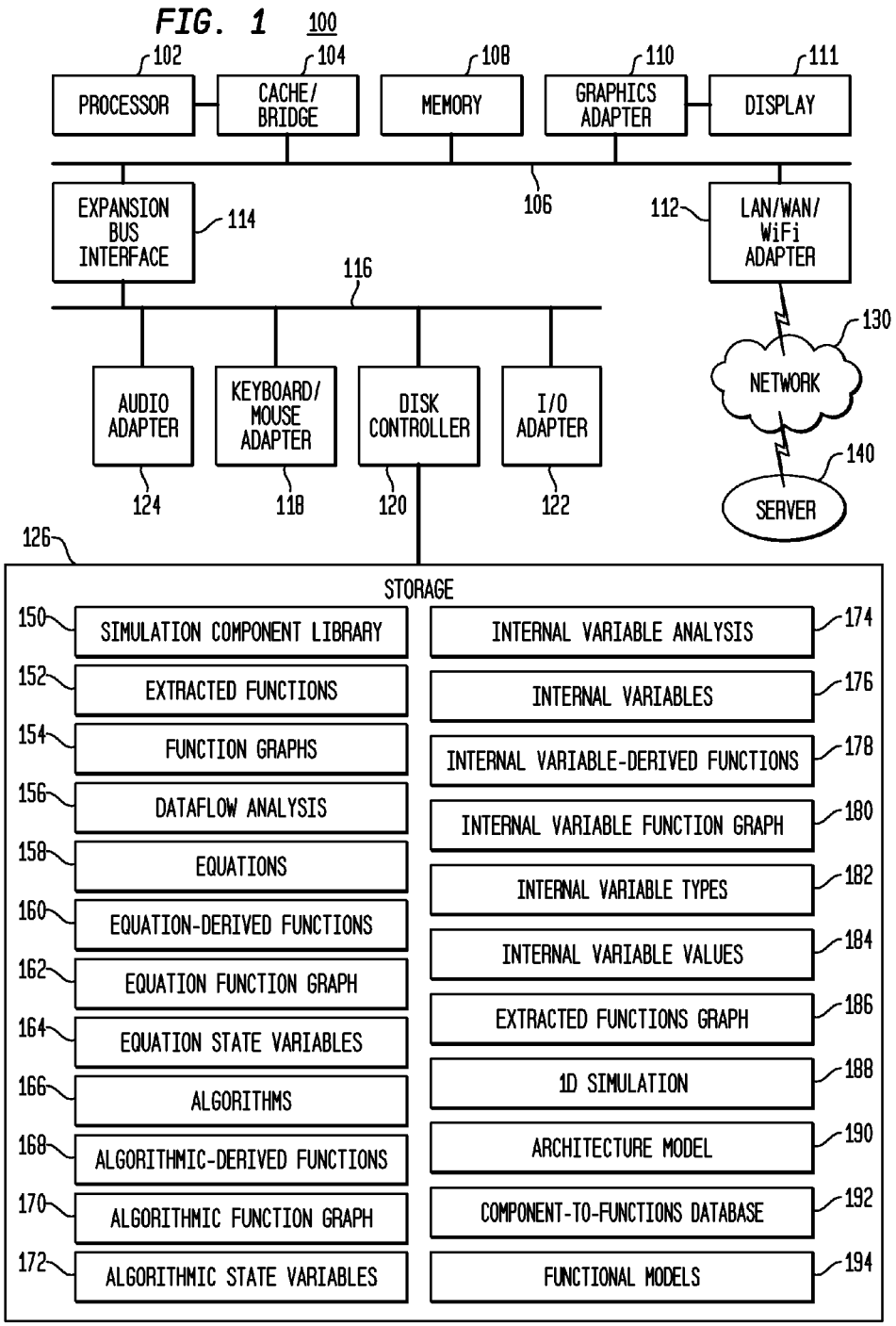
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the simulation component library 150, the extracted functions 152, the functions graphs 154, the dataflow analysis 156, the equations 158, the equation-derived functions 160, the equation function graph 162, the equation state variables 164, the algorithms 166, the algorithmic-derived functions 168, the algorithmic function graph 170, the algorithmic state variables 172, the internal variable analysis 174, the internal variables 176, the internal variable-derived functions 178, the internal variable function graph 180, the internal variable types 182, the internal variable values 184, the extracted functions graph 186, the 1D simulation 188, the architecture model 190, the component-to-functions database 192, functional models 194, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
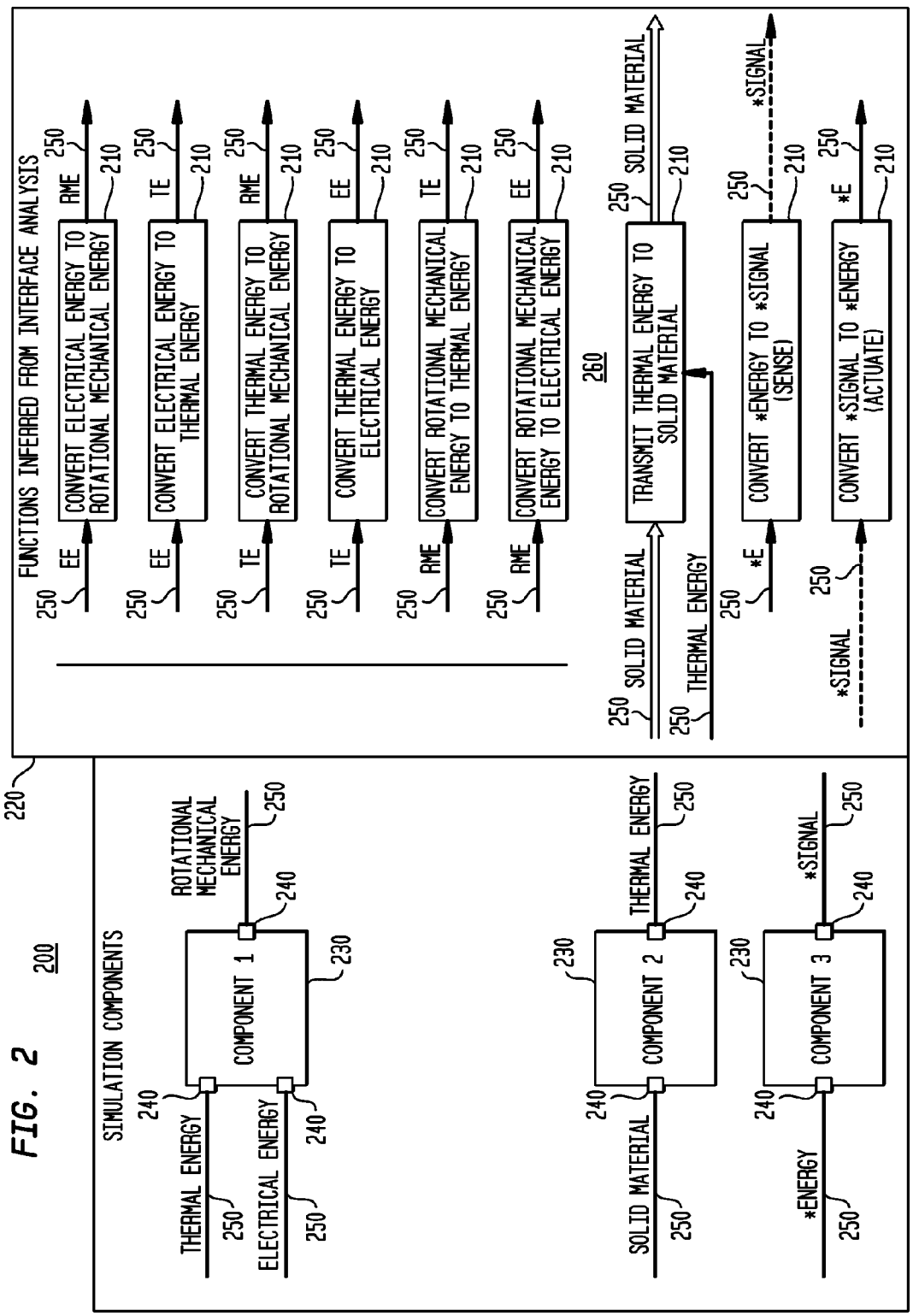
FIG. 2 illustrates an interface analysis on simulation components used to infer interface-derived functions of the simulation components in accordance with disclosed embodiments.

FIG. 2 illustrates an interface analysis 200 on simulation components 230 used to infer interface-derived functions 210 of the simulation component 230 in accordance with disclosed embodiments.

The first step is to analyze the simulation component's 230 interfaces to determine what type of energy, material, signals, or other interface-derived functions 210 can be exchanged with other simulation components 230 through its ports 240. FIG. 2 illustrates how the interface analysis 200 can be used to infer the interface-derived functions 210 achieved by a given simulation component 230. For example, simulation component 1 is modeled with three ports 240 having ports types 250: thermal, electrical, and rotational mechanical energy. Simulation component 230 exchanges energy through a pair of physical variables known as conjugate variables that represent effort and flow. The conjugate variables voltage and current represent electrical energy, torque and angular velocity represent rotational mechanical energy, and temperature and heat flow represent thermal energy. The process expands the port types 250 in the combinatorial space 260. Because the relationship between energy at the functional level and energy at the component level are known and well defined, the process can determine that simulation component 1 can perform the interface-derived function 210 of "convert" energy to or from any port 240 to the other ports 240. Thus, a total of six interface-derived functions 210 are inferred for simulation component 1. The interface-derived functions 210 are appended to an interface function graph 220.

Simulation component 2 illustrates an example of a simulation component 230 with two ports 240 with port types 250, solid material and thermal energy. The process expands the port types 250 in the combinatorial space 260. The process determines that the interface-derived function 210 "transmit thermal energy to solid material" with two inputs, solid material and thermal energy, and one output, solid material, is one interface-derived function 210 that can be accomplished by this simulation component 2. The interface-derived functions 210 for simulation component 2 are appended to the interface function graph 220.

Simulation component 3 shows an example of a simulation component 230 with two ports 240, an "any kind of energy" port 240 and an "any kind of signal" port 240 (denoted by *energy and *signal). The process expands the port types 250 in the combinatorial space 260. The process determines these two interface-derived functions 210 "convert *energy to *signal" and "convert *signal to *energy" can be fulfilled by this simulation component 3. Signals in a simulation component 230 are directed (causal), and therefore determining whether the interface-derived function 210 is "convert *energy to *signal" (sense) when the signal is an output from the simulation component 230 or the interface-derived function 210 is "convert *signal to *energy" (actuate) when the signal is an input to the simulation component 230 is straightforward for the process. The interface-derived functions 210 for the simulation component 3 are appended to the interface function graph 220.

Figure 3:
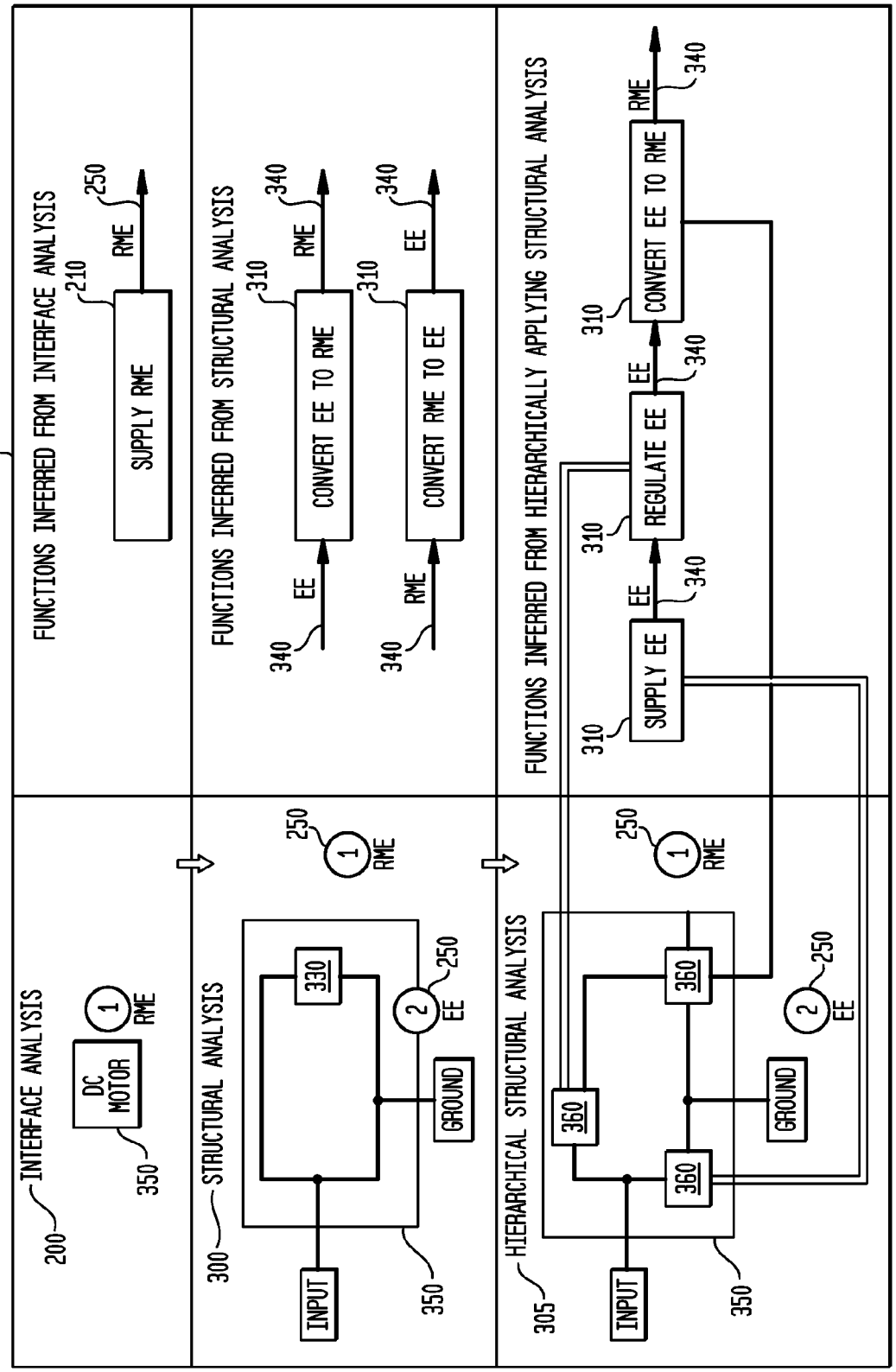
FIG. 3 illustrates a structural analysis on simulation components used to infer structural-derived functions of simulation sub-components of the simulation components in accordance with disclosed embodiments.

FIG. 3 illustrates a structural analysis 300 on simulation components 230 used to infer structural-derived functions 310 of simulation sub-components 330 of the simulation component 230 in accordance with disclosed embodiments.

In some cases, simulation components 230 are modeled internally with other domains that are not visible through their interface ports 240 and therefore the process performs a structural analysis 300—a hierarchical traversal and flattening—of the internal component structure to expose all the domains (e.g. electrical, mechanical, thermal, signals, etc.). FIG. 3 illustrates the interface port 240 of the "DCMotor1" simulation component 350, which is a simulation component 230 (illustrated in FIG. 2) of the Modelica Standard Library, with a single port 240 with a port type 250 of rotational mechanical energy (RME). The interface analysis 200 infers that the only interface-derived function 210 that is fulfilled by this simulation component is "supply rotational mechanical energy." The structural analysis 300 shows the internal composition of the "DCMotor1" simulation component 350 in terms of two domains: rotational mechanical energy and electrical energy. Although electrical simulation sub-components 330 exist, they are not exposed in the simulation component 230 interface analysis 200, and only performing an interface analysis 200 would lead to correct but not very detailed functionality of the simulation component 230. Therefore, using the structural analysis 300 the process identifies two additional structural-derived functions 310 "converting electrical energy to rotational mechanical energy" and "converting rotational mechanical energy to electrical energy" fulfilled by the "DCMotor1" simulation component 350.

A further level of structural analysis 300, referred to as hierarchical structural analysis 305, is show in FIG. 3. By applying the same principle to the electrical simulation sub-components 360 in the "DCMotor1" simulation component 350 a structural function graph 320 of structural-derived functions 310 can be inferred by the process. For example, the "SingalVoltage1" is connected to "Resistor1," and this is connected to "EMF1" simulation sub-components 330. Using the same structural analysis 300 and interface analysis 200 on the individual simulation sub-components 330, the process determines the flow of electrical energy as a structural function graph 320 of structural-derived functions 310 where "supply electrical energy," "regulate electrical energy," and "convert electrical energy to rotational mechanical energy" are connected. The results of the process provide a more detailed functional understanding of a simulation component 230 that can be used to drive the synthesis of architectures models according to different levels of fidelity.

Figure 4:
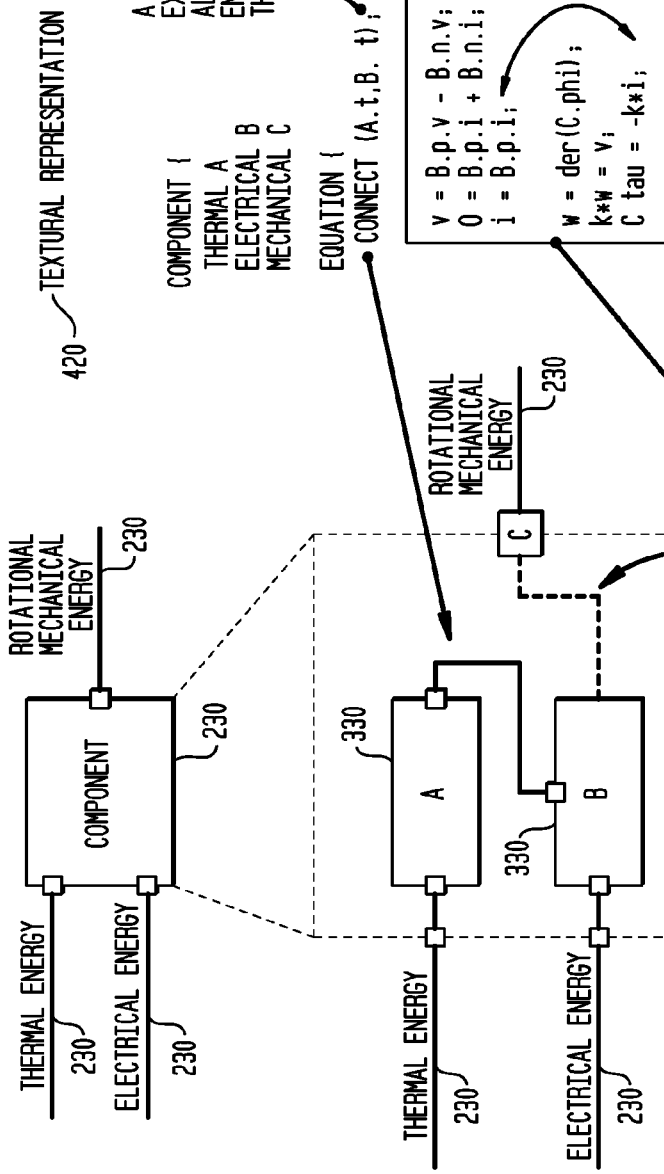
FIG. 4 illustrates an equation-algorithmic analysis on simulation components used to infer equation-derived functions and algorithmic-derived functions in accordance with disclosed embodiments.

FIG. 4 illustrates an equation-algorithmic analysis 400 on a simulation component 230 used to infer equation-derived functions 160 and algorithmic-derived functions 168 in accordance with disclosed embodiments.

Simulation components 230 are implemented without abstractions, i.e. reusable simulation sub-components 330 with well-defined port types 250 and sub-component port types 340, and the relationship between the different domains is expressed directly in equations 158 or algorithms 166, rather than the connection between simulation sub-components 330. In a process similar to the structural analysis 300, the process determines the equation-derived functions 160 and algorithmic-derived functions 168 based on the relationship between different domains in a simulation component 230 directly from the equations 158 and algorithms 166, rather than the topology of the simulation sub-components 330, where most equation-based languages rely on both a graphical representation 410 to describe simulation components 230 and simulation sub-components 330 and textual representations 420 that describe the behavior of the simulation component 230 in terms of equations 158 and algorithms 166. FIG. 4 illustrates an example with a simulation component 230 where only two out of three domains, "A" and "B", are related by topological relationships modeled directly in the graphical representation 410. The relationship between the third domain to the other two domains cannot be determined by a structural analysis 300 and requires a textual representation 420 for the equations 158 and algorithms 166 of the simulation component 230 to be parsed. In this embodiment, the domain "C" is related to domain "B" through the equations 158 defined for the simulation component 230. Although the purpose of the equation-algorithmic analysis 400 is identical to the structural analysis 300, the equation-algorithmic analysis 400 discovers the topology in the equations 158 and algorithms 166 and the structural analysis 300 discovers the topology in the simulation sub-components 330.

Figure 5:
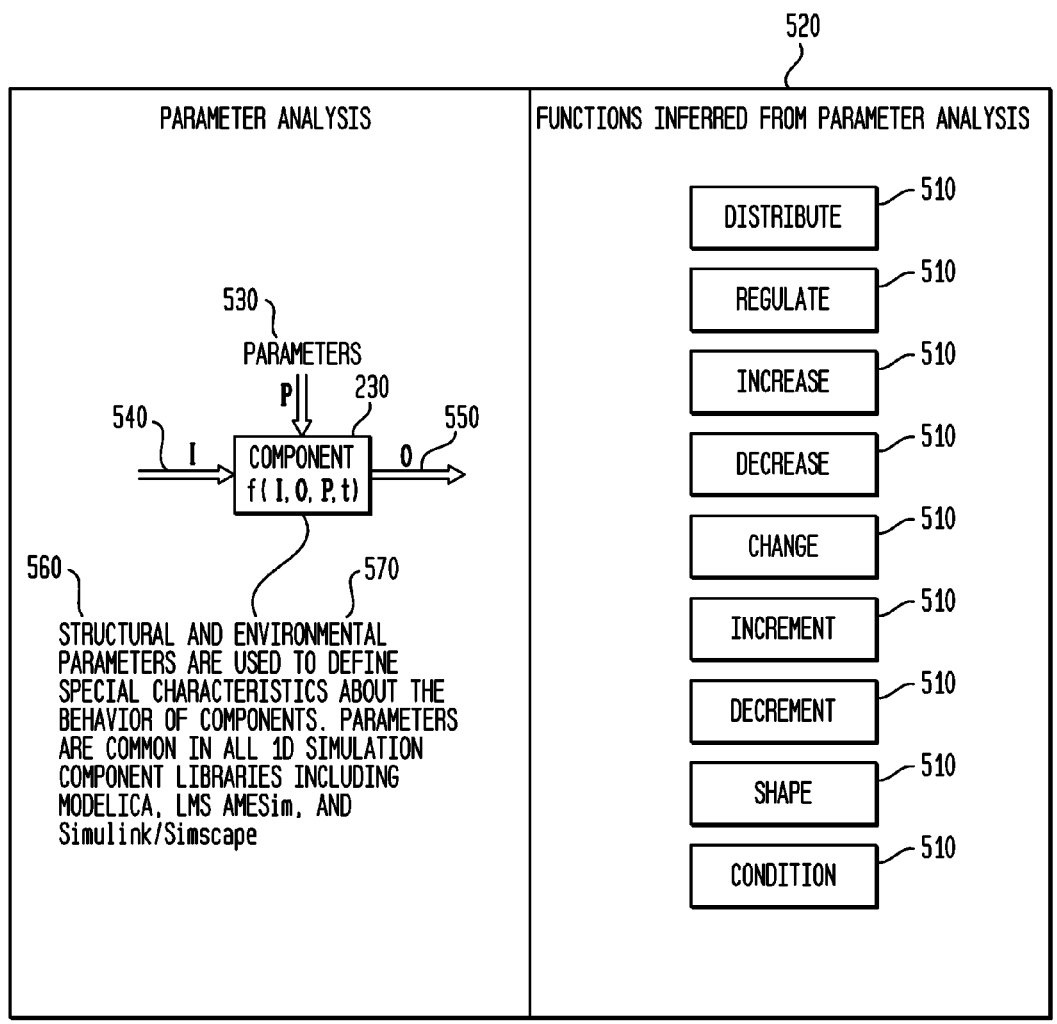
FIG. 5 illustrates a parameter analysis on simulation components used to infer parameter-derived functions in accordance with disclosed embodiments.

FIG. 5 illustrates a parameter analysis 500 on a simulation component 230 used to infer parameter-derived functions 510 in accordance with disclosed embodiments.

Parameters 530 are common entities in simulation component libraries 150 used to define special characteristics of the behavior of simulation component 230. Parameters 530 influence the inputs 540 and the outputs 550 of a simulation component 230 and are used to determine more information about the functionality of the simulation component 230 as shown in FIG. 5. The parameter analysis 500 attempts to determine parameters 530 with inputs 540, outputs 550, equations 158, and algorithms 166 of the simulation component 230. The parameter analysis 500 relies on information provided by the interface analysis 200 (illustrated in FIG. 2), the structural analysis 300 (illustrated in FIG. 3), and the equation-algorithmic analysis 400 (illustrated in FIG. 4) to be effective. Some simulation languages consider two kinds of parameters 530, structural parameters 560 and environmental parameter 570. Structural parameters 560 refer to parameters 530 with component-level scope. Environmental parameters 570 refer to parameters 530 with global-level scope, such as gravity, environmental conditions, etc.

FIG. 6 illustrates an example of a parameter analysis 500 demonstrating parameters 530 inferring parameter-derived functions 510 in accordance with disclosed embodiments.

FIG. 6 illustrates an example how the parameter 530 "y1" of the "Valve" simulation component 630 from the Modelica Standard Library is used in the implementation to control the valve opening, parameter type 610, and therefore regulate the thermal or pneumatic flow at the simulation component's 230 ports 240 by changing the parameter value 620. The simulation component library 150 does not contain any semantic information to describe this aspect. The parameter analysis 500 traces the use of the parameter 530 "y1" in the equation-algorithmic implementation of the simulation component using the equation-algorithmic analysis 400 and determines that "y1" is used as the denominator of the output equation in both paths of the conditional expression. The use of "y1" in the denominator of the equation 158 for the output 550 of the simulation component 230 suggests that the "Valve" simulation component 630 can be used as a parameter-derived function 510 to "inhibit thermal/pneumatic energy" or "inhibit gas/liquid material." The interface analysis 200 and equation-algorithmic analysis 400 are used in combination with the parameter analysis 500 to determine the type of input 540 and output 550 flows to the generated parameter-derived function 510.

Figure 7:
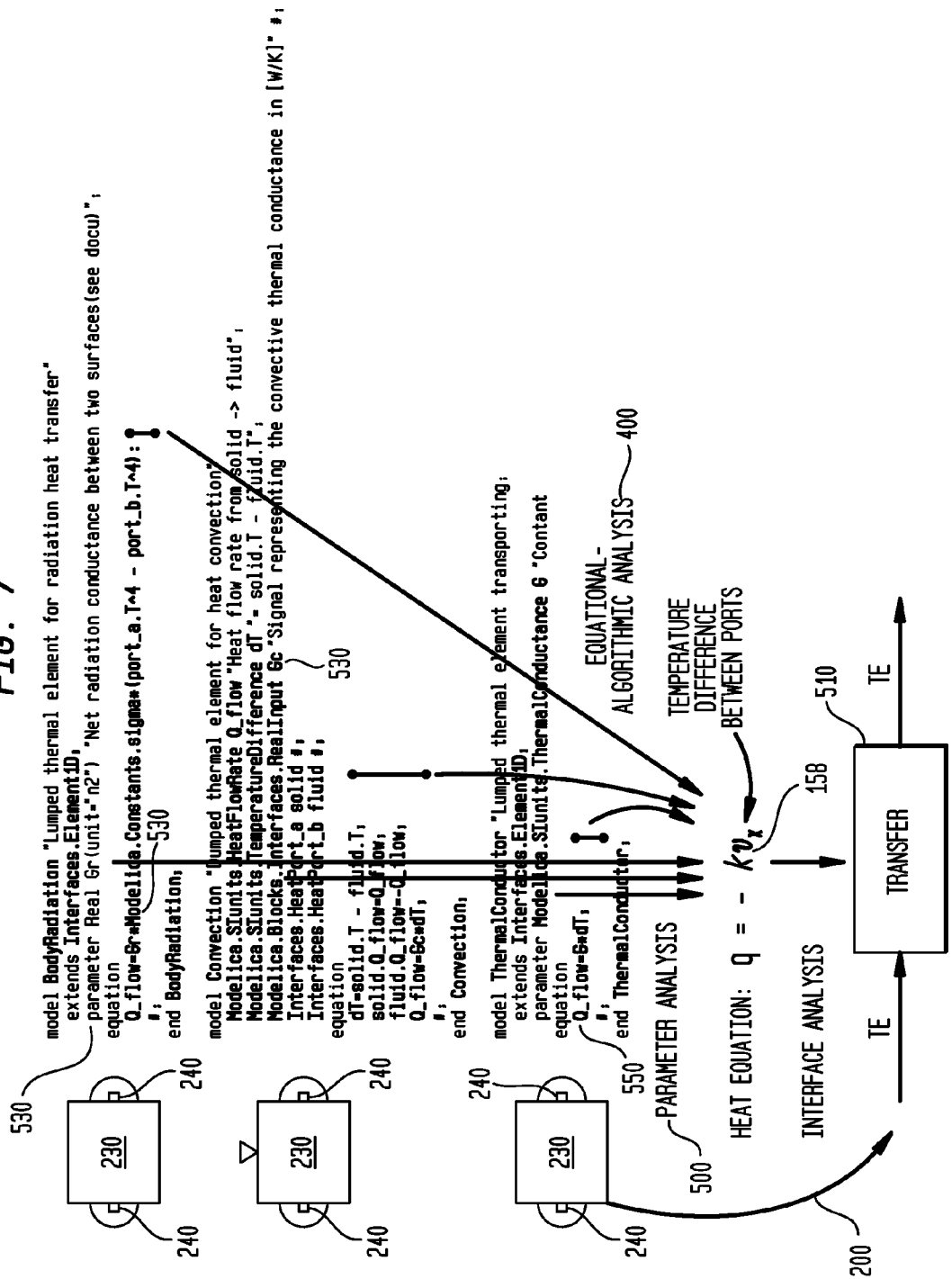
FIG. 7 illustrates the interaction of a parameter analysis with the information provided by the equation-algorithmic analysis and interface analysis in accordance with disclosed embodiments.

FIG. 7 illustrates the interaction of a parameter analysis 500 with the information provided by the equation-algorithmic analysis 400 and interface analysis 200 in accordance with disclosed embodiments.

FIG. 7 illustrates three simulation components 230 from the thermal domain from the Modelica Standard Library. For each of the simulation components 230, "bodyRadiation1," "convection1," and "thermalConductor1 ," the parameter analysis 500 determines that the parameters 530 "Gr," "Gc," and "G" are used by the equation 158 for the output 550 Q_flow, the heat equation common to all heat transfer mechanisms, as a gain applied over the temperature difference between the ports 240. The parameter analysis 500 suggests that these simulation components 230 fulfill the functionality of "transfer thermal energy."

Figure 8:
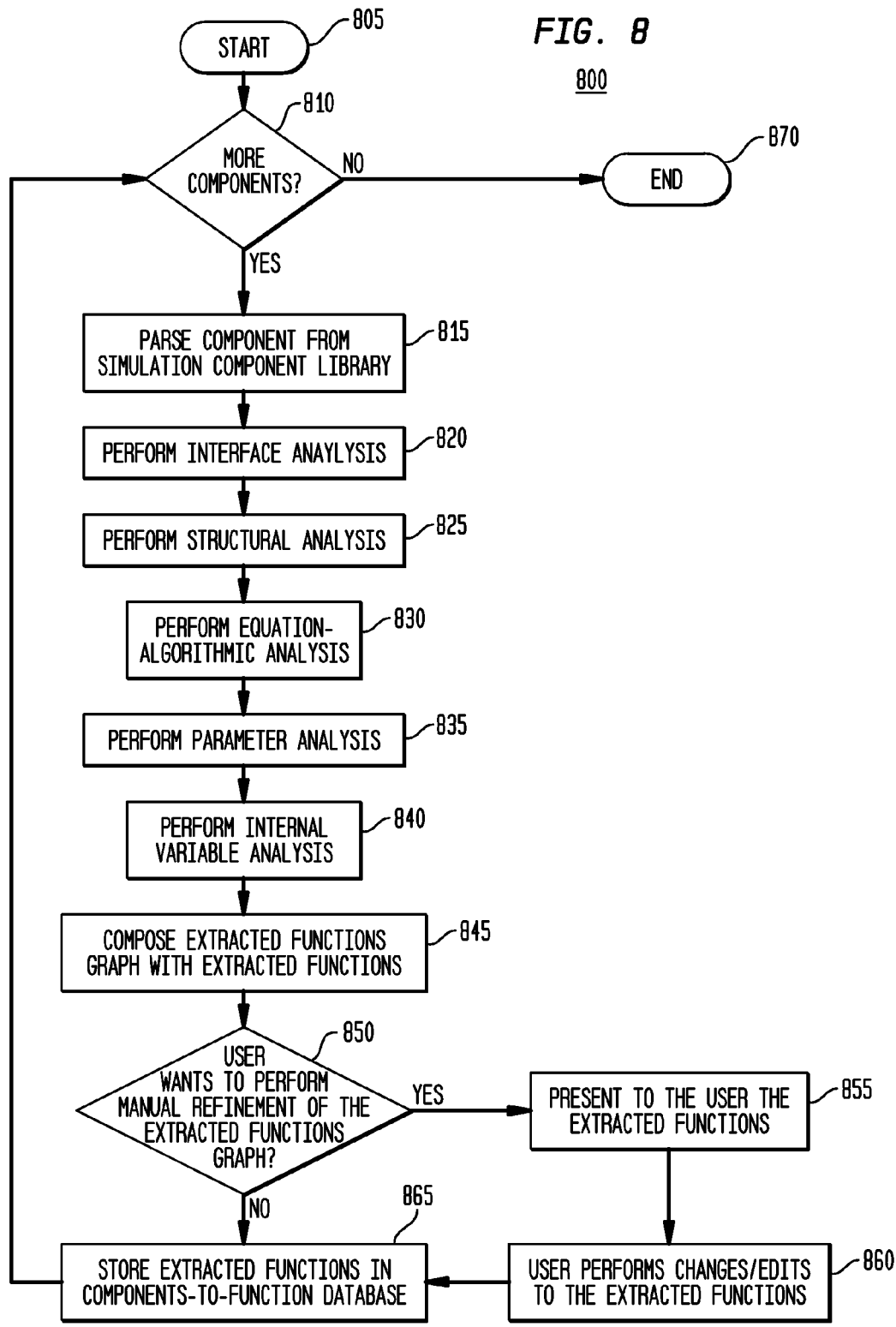
FIG. 8 illustrates a flowchart of a method for classifying and correlating simulation components to functional models in accordance with disclosed embodiments.

FIG. 8 illustrates a flowchart 800 of a method for classifying and correlating simulation components 230 to functional models 194 in accordance with disclosed embodiments.

In step 805, the method for classifying and correlating simulation components 230 to functional models 194 starts. The system receives a simulation component library 150 comprising a plurality of simulation components 230 into a memory 108 of the data processing system 100. Example of functional models 194 includes the interface-derived functions 210, the structural-derived functions 310, equation-derived functions 160, algorithmic derived functions 168, parameter-derived functions 510, and internal variable-derived functions 178.

In step 810, the system determines whether the simulation component library 150 contains any simulation components 230 that have not been classified and correlated to functional models 194. For each simulation component 230 in the simulation component library 150, the system performs step 815 through step 865. Upon a determination that the every simulation component 230 in the simulation component library 150 has been classified and correlated to functional models 194, the process ends.

In step 815, the system parses the simulation component 230 from the simulation component library 150. The system performs a plurality of analyses to determine extracted functions 152 from the simulation component 230. The plurality of analysis includes one or more of an interface analysis 200, a structural analysis 300, an equation-algorithmic analysis 400, a parameter analysis 500, and an internal variable analysis 174. The system then analyzes a plurality of extracted functions 152 into a plurality of function graphs 154 for each of the plurality of simulation components 230. Where the plurality of extracted functions 152 includes one or more of a plurality of interface-derived functions 210, a plurality of structural-derived functions 310, a plurality of equation-derived functions 160, a plurality of algorithmic-derived functions 168, a plurality of parameter-derived functions 510, and a plurality of internal variable-derived functions 178. Where the plurality of function graphs 154 includes one or more of an interface function graph 220, a structural function graph 320, an equation function graph 162, an algorithmic function graph 170, a parameter function graph 520, and an internal variable function graph 180.

In step 820, the system performs an interface analysis 200 on the simulation component 230. Performing an interface analysis 200 for each of a plurality of ports 240 in a simulation component 230 determines the plurality of interface-derived functions 210 in the interface function graph 220. The interface analysis 200 is described in more detail with FIG. 9.

In step 825, the system performs a structural analysis 300 on the simulation component 230. Performing a structural analysis 300 for each of a plurality of simulation sub-components 330 in the simulation component 230 determines the plurality of structural-derived functions 310 in the structural function graph 320. The structural analysis 300 is described in more detail with FIG. 10.

In step 830, the system performs an equation-algorithmic analysis 400 on the simulation component 230. Performing an equation-algorithmic analysis 400 for each of a plurality of equations 158 and a plurality of algorithms 166 in the simulation component 230 determines the plurality of equation-derived functions 160 in the equation function graph 162 and the plurality of algorithmic-derived functions 168 in the algorithmic function graph 170. The equation-algorithmic analysis 400 is described in more detail with FIG. 11.

In step 835, the system performs a parameter analysis 500 on the simulation component 230. Performing a parameter analysis 500 for each of the plurality of parameters 530 in the simulation component 230 determines the plurality of parameter-derived functions 510 in the parameter function graph 520. The parameter analysis 500 is described in more detail with FIG. 12.

In step 840, the system performs an internal variable analysis 174 on the simulation component 230. Performing an internal variable analysis 174 for each of a plurality of internal variables 176 in the simulation component 230 determine the plurality of internal variable-derived functions 178 in the internal variable function graph 180. The internal variable analysis 174 is described in more detail with FIG. 13.

In step 845, the system composes an extracted functions graph 186 with the plurality of extracted functions 152. The extracted functions graph 186 combines one or more of the plurality of extracted functions 152 of the plurality of function graphs 154 including the plurality of interface-derived functions 210 in the interface function graph 220 of the interface analysis 200, the plurality of structural-derived functions 310 in the structural function graph 320 of the structural analysis 300, the plurality of equation-derived functions 160 in the equation function graph 162 and the plurality of algorithmic-derived functions 168 in the algorithmic function graph 170 of the equation-algorithmic analysis 400, the plurality of parameter-derived functions 510 in the parameter function graph 520 of the parameter analysis 500, and the plurality of the internal variable-derived functions 178 in the internal variable function graph 180 of the internal variable analysis 174.

In step 850, the user wants to perform a manual refinement of the extracted functions graph 186. The system transmits the extracted functions graph 186 to the user and receives an input from the user indicating whether or not the user intends to manually refine the extracted functions graph 186. When the system receives an indication that the user want to manually refine the extracted functions graph 186, the system moves on to step 855. When the system receives an indication that the user does not want to manually refine the extracted functions graph 186, the system moves to step 865.

In step 855, the system presents the extracted functions 152 to the user. The system presents the extracted functions 152 by transmitting the plurality of extracted functions 152 to a display 111.

In step 860, the user performs changes or edits to the extracted functions 152. The system receives the changes or edits to the extracted functions 152 and modifies the extracted functions graph 186 with the changes or the edits received from the user.

In step 865, the system stores the extracted functions 152 in a component-to-functions database 192. The storage 126 includes the extracted functions 152 in the extracted functions graph 186.

In some embodiments, the system receives a 1D simulation 188 that includes a plurality of simulation components 230 from the simulation component library 150. The system then produces an architecture model 190 based on the extracted functions graph 186.

Once the system has determined that all of the plurality of simulation components 230 have been classified and correlated to functions models 194, the system proceeds to step 870 and the process ends.

Figure 9:
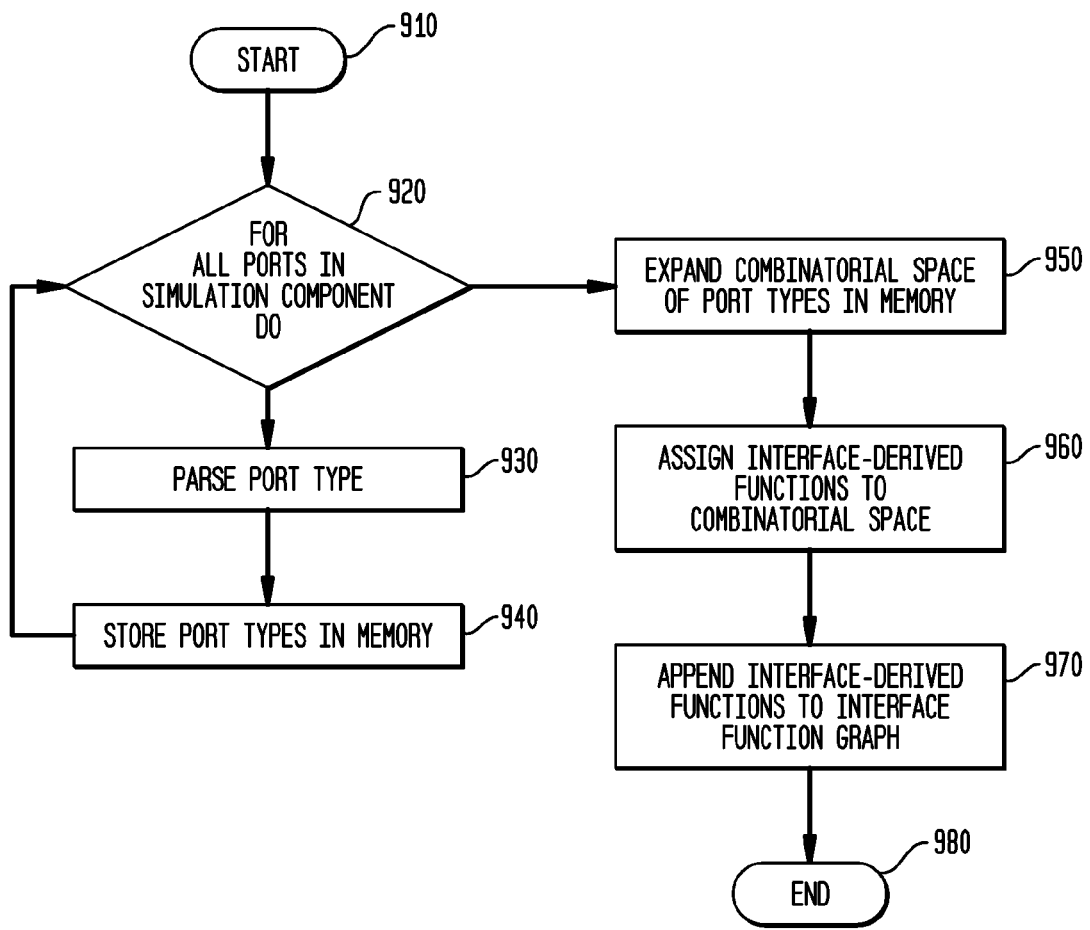
FIG. 9 illustrates a flowchart for performing an interface analysis for each of a plurality of ports in a simulation component in accordance with disclosed embodiments.

FIG. 9 illustrates an interface analysis flowchart 900 for performing an interface analysis 200 for each of a plurality of ports 240 in a simulation component 230 in accordance with disclosed embodiments.

In step 910, the system begins performing an interface analysis 200 for each of a plurality of ports 240 in a simulation component 230 to determine the plurality of interface-derived functions 210 in the interface function graph 220. The system receives a simulation component 230 to analyze the plurality of interface-derived functions 210 of the simulation component's 230 ports 240.

In step 920, the system determines whether an interface analysis 200 was performed on each of the ports 240 in the simulation component 230. For each port 240 in the simulation component 230, the system performs step 930 and step 940. Upon a determination that an interface analysis 200 was performed on each of the ports 240 in the simulation component 230, the system continues with step 950.

In step 930, the system parses the port type 250 from a port 240 of the simulation component 230. In step 940, the system stores the port type 250 in the memory 108.

In step 950, the system expands a combinatorial space 260 of the port type 250 in the memory 108. In step 960, the system assigns the plurality of interface-derived functions 210 to the combinatorial space 260. In step 970, the system appends the plurality of interface-derived functions 210 to the interface function graph 220.

In step 980, the system ends performing an interface analysis 200 for each of the plurality of ports 240 in the simulation component 230 to determine the plurality of interface-derived functions 210 in the interface function graph 220. The system returns any suitable information determined by the interface analysis 200 including, but not limited to, the ports 240 of the simulation component 230, the port types 250 of the simulation component 230, the plurality of interface-derived functions 210, and the interface function graph 220.

Figure 10:
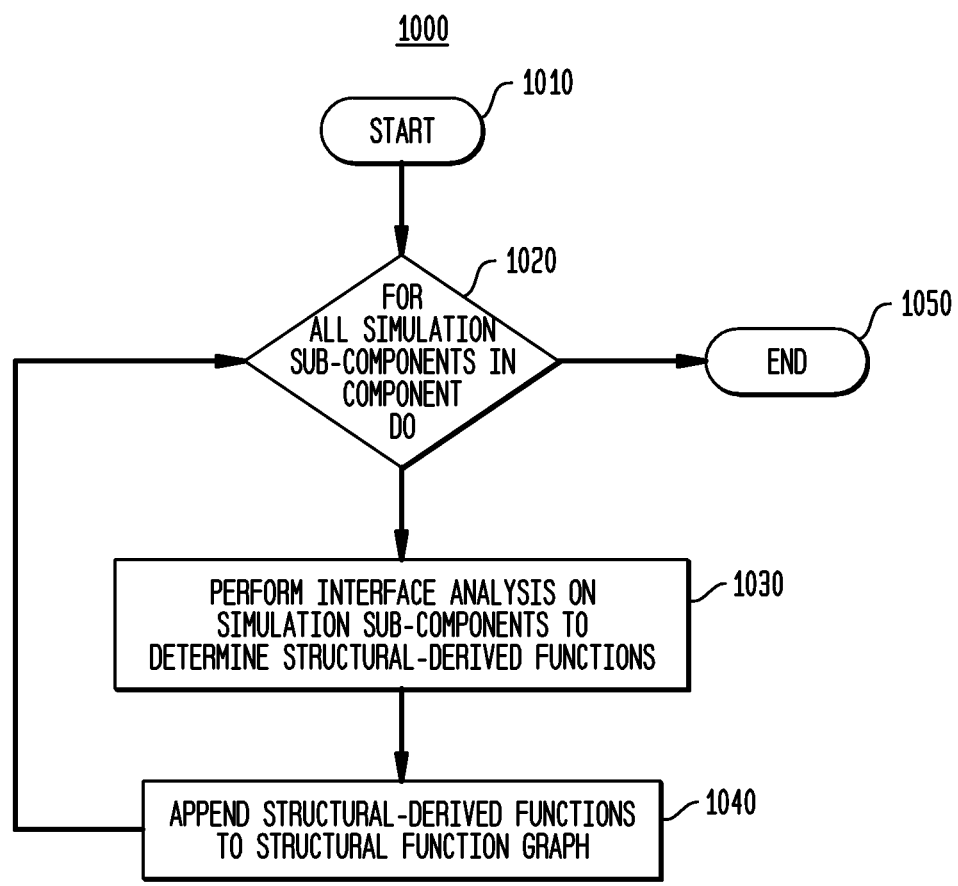
FIG. 10 illustrates a flowchart for performing a structural analysis for each of a plurality of simulation sub-components in a simulation component in accordance with disclosed embodiments.

FIG. 10 illustrates a structural analysis flowchart 1000 for performing a structural analysis 300 for each of a plurality of simulation sub-components 330 in a simulation component 230 in accordance with disclosed embodiments.

In step 1010, the system begins performing a structural analysis 300 for each of a plurality of simulation sub-components 330 in the simulation component 230 to determine the plurality of structural-derived functions 310 in the structural function graph 320. The system receives a simulation component 230 to analyze the plurality of structural-derived functions 310 of the simulation component's 250 simulation sub-components 330.

In step 1020, the system determines whether a structural analysis 300 was performed on each of the plurality of simulation sub-components 330 in the simulation component 230. For each simulation sub-component 330 in the simulation component 230, the system performs step 1030 and step 1140. Upon a determination that a structural analysis 300 has been performed on each of the plurality of simulation sub-components 330, the system completes the process with step 1050.

In step 1030, the system performs an interface analysis 200 on the simulation sub-components 330 to determine the structural-derived functions 310. The system extracts the plurality of structural-derived functions 310 of a plurality of sub-component port types 340 by performing an interface analysis 200 on the simulation sub-component 330. In step 1040, the system appends the plurality of structural-derived functions 310 to the structural function graph 320.

In step 1050, the system ends performing a structural analysis 300 for each of the plurality of simulation sub-components 330 in the simulation component 230 to determine the plurality of structural-derived functions 310 in the structural function graph 320. The system returns any suitable information determined by the structural analysis 300 including, but not limited to, the simulation sub-components 330 of the simulation component 230, the ports 240 of the simulation sub-component 330, the sub-component port types 340, the plurality of structural-derived functions 310, and the structural function graph 320.

Figure 11:
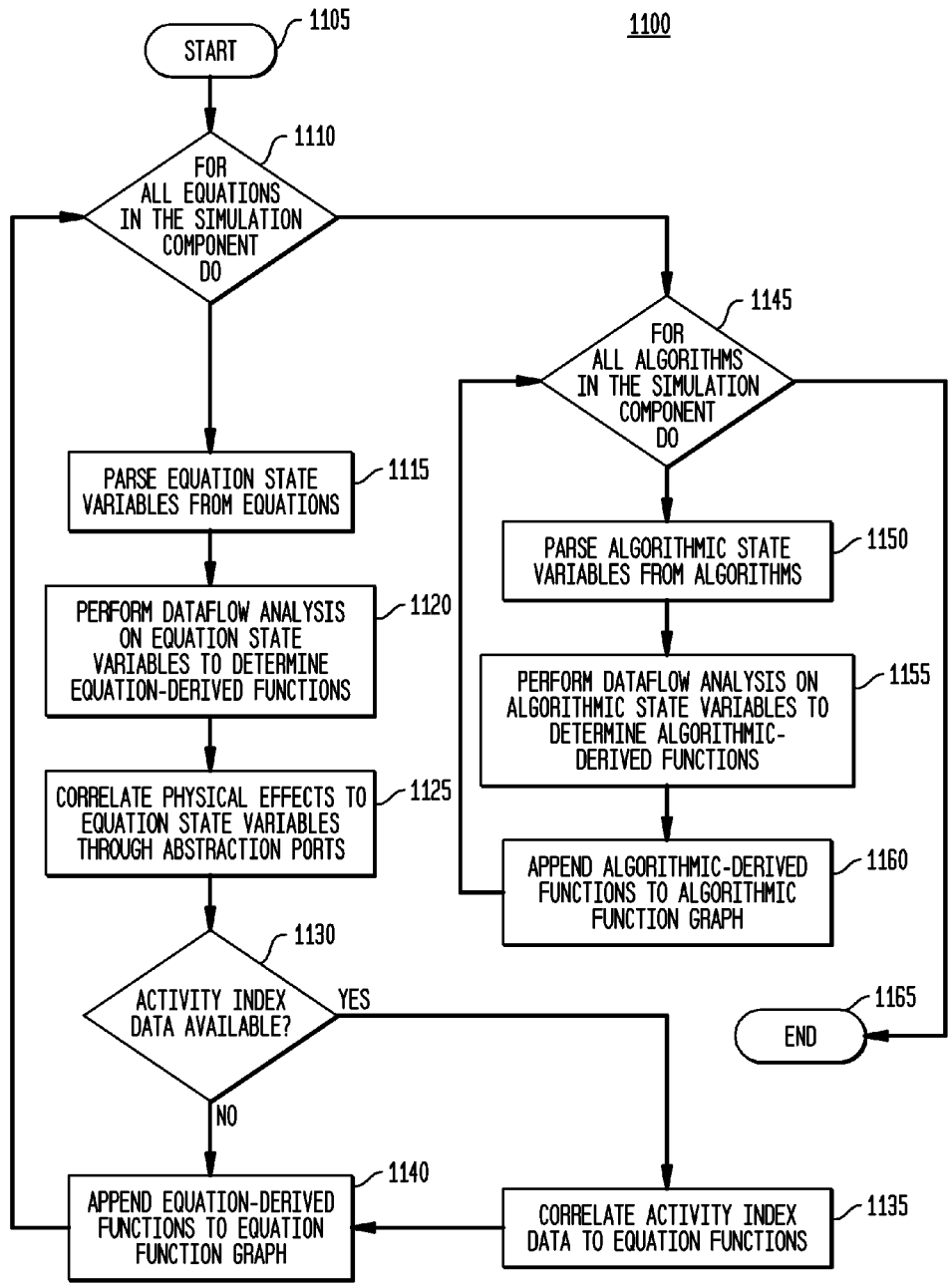
FIG. 11 illustrates a flowchart for performing an equation-algorithmic analysis for each of a plurality of equations and a plurality of algorithms in a simulation component in accordance with disclosed embodiments.

FIG. 11 illustrates an equation-algorithmic analysis flowchart 1100 for performing an equation-algorithmic analysis 400 for each of a plurality of equations 158 and a plurality of algorithms 166 in a simulation component 230 in accordance with disclosed embodiments.

In step 1105, the system begins performing an equation-algorithmic analysis 400 for each of a plurality of equations 158 and a plurality of algorithms 166 in the simulation component 230 to determine the plurality of equation-derived functions 160 in the equation function graph 162 and the plurality of algorithmic-derived functions 168 in the algorithmic function graph 170. The system receives the simulation component 230 to analyze the equation-derived functions 160 and the algorithmic-derived functions 168 of the simulation component's 240 equations 158 and algorithms 166.

In step 1110, the system determines whether an equation-algorithmic analysis 400 was performed on each of the plurality of equations 158 in the simulation component 230. For each equation 158 in the simulation component 230, the system performs step 1115 through step 1140. Upon a determination that an equation-algorithmic analysis 400 has been performed on each of the plurality of equations 158 in the simulation component 230, the system continues with step 1145.

In step 1115, the system parses a plurality of equation state variables 164 from an equation 158. In step 1120, the system performs a dataflow analysis 156 on the plurality of equation state variables 164 to determine the plurality of equation-derived functions 160.

In step 1125, the system correlates physical effects to equation state variables 164 through abstraction ports. In step 1130, the system determines is activity index data is available. When activity index data is available, the system proceeds to step 1135 and correlates the activity index data to equation-derived functions 160. When activity index data is not available or the system has completed step 1135, the system proceeds to step 1140 and appends the equation-derived functions 160 to the equation function graph 162.

In step 1145, the system determines whether an equation-algorithmic analysis 400 was performed on each of the plurality of algorithms 166 in the simulation component 230. For each algorithm 166 in the simulation component 230, the system performs step 1150 through step 1160. Upon a determination that an equation-algorithmic analysis 400 has been performed on each of the plurality of algorithms 166 in the simulation component 230, the system continues with step 1165.

In step 1150, the system parses a plurality of algorithmic state variables 172 from an algorithm 166. In step 1155, the system performs a dataflow analysis 156 on the plurality of algorithmic state variables 172 to determine the plurality of algorithmic-derived functions 168. In step 1160, the system appends the algorithmic-derived functions 168 to the algorithmic function graph 170.

In step 1165, the system ends performing an equation-algorithmic analysis 400 for each of the plurality of equations 158 and the plurality of algorithms 166 in the simulation component 230 to determine the plurality of equation-derived functions 160 in the equation function graph 162 and the plurality of algorithmic-derived functions 168 in the algorithmic function graph 170. The system returns any suitable information determined by the equation-algorithmic analysis 400 including, but not limited to, the equations 158 of the simulation component 230, the algorithms 166 of the simulation component 230, the plurality of equation state variables 164, the plurality of algorithmic state variables 172, the plurality of equation-derived functions 160, the plurality of algorithmic-derived functions 168, the equation function graph 162 and the algorithmic function graph 170.

FIG. 12 illustrates a parameter analysis flowchart 1200 for performing a parameter analysis 500 for each of a plurality of parameters 530 in a simulation component 230 in accordance with disclosed embodiments.

In step 1210, the system begins performing a parameter analysis 500 for each of a plurality of parameters 530 in the simulation component 230 to determine the plurality of parameter-derived functions 510 in the parameter function graph 520. The system receives a simulation component 230 to analyze the parameter-derived functions 510 of the simulation component's 250 parameters 530.

In step 1220, the system determines whether a parameter analysis 500 was performed on each of the plurality of parameters 530 in the simulation component 230. For each parameter 530 in the simulation component 230, the system performs step 1230 through step 1280. Upon a determination that a parameter analysis 500 has been performed on each of the plurality of parameters 530 in the simulation component 230, the system continues with step 1290.

In step 1230, the system parses a parameter type 610 and a parameter value 620 from a parameter 530. In step 1240, the system extracts a plurality of port types 250 from the interface analysis 200 of the simulation component 230. In step 1250, the system extracts a plurality of sub-component port types 340 from the structural analysis 300 of the simulation component 230. In step 1260, the system extracts a plurality of equation state variables 164 and a plurality of algorithmic state variables 172 from the equation-algorithmic analysis 400 of the simulation component 230.

In step 1270, the system determines a plurality of parameter-derived functions 510 based on a relationship of the parameter type 610 and the parameter value 620 with the plurality of port types 250, the plurality of sub-component port types 340, the plurality of equation state variables 164 and the plurality of algorithmic state variables 172. In step 1280, the system appends the plurality of parameter-derived functions 510 to the parameter function graph 520.

In step 1290, the system ends performing a parameter analysis 500 for each of the plurality of parameters 530 in a simulation component 230 to determine the plurality of parameter-derived functions 510 in the parameter function graph 520. The system returns any suitable information determined by the parameter analysis 500 including, but not limited to, the parameter types 610 of the simulation component 230, the parameter values 620 of the simulation component 230, the plurality of parameter-derived functions 510, and the parameter function graph 520.

FIG. 13 illustrates an internal variable analysis flowchart 1300 for performing an internal variable analysis 174 for each of a plurality of internal variables 176 in a simulation component 230 in accordance with disclosed embodiments.

In step 1305, the system begins performing an internal variable analysis 174 for each of a plurality of internal variables 176 in a simulation component 230 to determine the plurality of internal variable-derived functions 178 in the internal variable function graph 180. The system receives a simulation component 230 to analyze the internal variable-derived functions 178 of the simulation component's 230 internal variables 176.

In step 1310, the system determines whether an internal variable analysis 174 was performed on each of the plurality of internal variables 176 in the simulation component 230. For each internal variable 176 in the simulation component 230, the system performs step 1315 through step 1345. Upon a determination that an internal variable analysis 174 has been performed on each of the plurality of internal variables 176 in the simulation component 230, the system continues with step 1350.

In step 1315, the system parses an internal variable type 182 and an internal variable value 184 from an internal variable 176. In step 1320, the system extracts a plurality of parameter types 610 and a plurality of parameter values 620 from the parameter analysis 500 of the simulation component 230. In step 1325, the system extracts a plurality of port types 250 from the interface analysis 200 of the simulation component 230. In step 1330, the system extracts a plurality of sub-component port types 340 from the structural analysis 300 of the simulation component 230. In step 1335, the system extracts a plurality of equation state variables 164 and a plurality of algorithmic state variables 172 from the equation-algorithmic analysis 400 of the simulation component 230.

In step 1340, the system determines a plurality of internal variable-derived functions 178 based on a relationship of the internal variable type 182 and the internal variable value 184 with the plurality of parameter types 610, the plurality of parameter values 620, the plurality of port types 250, the plurality of sub-component port types 340, the plurality of equation state variables 164 and the plurality of algorithmic state variables 172. In step 1345, the system appends the plurality of internal variable-derived functions 178 to the internal variable function graph 180.

In step 1350, the system ends performing an internal variable analysis 174 for each of a plurality of internal variables 176 in a simulation component 230 to determine the plurality of internal variable-derived functions 178 in the internal variable function graph 180. The system returns any suitable information determined by the internal variable analysis 174 including, but not limited to, the internal variable types 182 of the simulation component 230, the internal variable values 184 of the simulation component 230, the plurality of internal variable-derived functions 178, and the internal variable function graph 180.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 U.S.C §112(f) unless the exact words "means for" are followed by a participle.

What is claimed is:

1. A method for classifying and correlating simulation components to functional models, the method performed by a data processing system and comprising:
   receiving a simulation component library comprising a plurality of simulation components into a memory of the data processing system;
   parsing the plurality of simulation components from the simulation component library;
   analyzing a plurality of extracted functions into a plurality of function graphs for each of the plurality of simulation components, wherein the plurality of extracted functions includes one or more of a plurality of interface-derived functions, a plurality of structural-derived functions, a plurality of equation-derived functions, a plurality of algorithmic-derived functions, a plurality of parameter-derived functions, and a plurality of internal variable-derived functions, and wherein the plurality of function graphs includes one or more of an interface function graph, a structural function graph, an equation function graph, an algorithmic function graph, a parameter function graph, and an internal variable function graph;
   composing an extracted functions graph with the plurality of extracted functions of the plurality of function graphs; and
   storing the extracted functions graph of the plurality of extracted functions in a components-to-function database.

2. The method of claim 1, wherein analyzing the plurality of extracted functions into the plurality of function graphs comprises:
   performing an interface analysis for each of a plurality of ports in a simulation component to determine the plurality of interface-derived functions in the interface function graph;

performing a structural analysis for each of a plurality of simulation sub-components in the simulation component to determine the plurality of structural-derived functions in the structural function graph;

performing an equation-algorithmic analysis for each of a plurality of equations and a plurality of algorithms in the simulation component to determine the plurality of equation-derived functions in the equation function graph and the plurality of algorithmic-derived functions in the algorithmic function graph;

performing a parameter analysis for each of a plurality of parameters in the simulation component to determine the plurality of parameter-derived functions in the parameter function graph; and performing an internal variable analysis for each of a plurality of internal variables in the simulation component to determine the plurality of internal variable-derived functions in the internal variable function graph.

3. The method of claim 2, wherein performing the interface analysis comprises:

parsing a port type from a port of the simulation component;

storing the port type in the memory;

expanding a combinatorial space of the port type in the memory;

assigning the plurality of interface-derived functions to the combinatorial space; and appending the plurality of interface-derived functions to the interface function graph.

4. The method of claim 2, wherein performing the structural analysis comprises:

extracting the plurality of structural-derived functions of a plurality of sub-component port types by performing an interface analysis on the simulation sub-component; and appending the plurality of structural-derived functions to the structural function graph.

5. The method of claim 2, wherein performing the equation-algorithmic analysis comprises:

parsing a plurality of equation state variables from an equation and a plurality of algorithmic state variables from an algorithm;

performing a dataflow analysis on the plurality of equation state variables of the plurality of equations to determine the plurality of equation-derived functions and a dataflow analysis on the plurality of algorithmic state variables of the plurality of algorithms to determine the plurality of algorithmic-derived functions; and appending the plurality of equation-derived functions to the equation function graph and the plurality of algorithmic-derived functions to the algorithmic function graph.

6. The method of claim 2, wherein performing the parameter analysis comprises:

parsing a parameter type and a parameter value from a parameter;

extracting a plurality of port types from the interface analysis of the simulation component;

extracting a plurality of sub-component port types from the structural analysis of the simulation component;

extracting a plurality of equation state variables and a plurality of algorithmic state variables from the equation-algorithmic analysis of the simulation component;

determining the plurality of parameter-derived functions based on a relationship of the parameter type and the parameter value with the plurality of port types, the plurality of sub-component port types, the plurality of equation state variables and the plurality of algorithmic state variables; and appending the plurality of parameter-derived functions to the parameter function graph.

7. The method of claim 2, further comprising:

receiving a 1D simulation that includes a plurality of simulation components from the simulation component library; and producing an architecture model based on the extracted functions graph.

8. A data processing system comprising:

a processor; and an accessible memory, the data processing system particularly configured to receive a simulation component library comprising a plurality of simulation components into the accessible memory of the data processing system;

parse the plurality of simulation components from the simulation component library;

analyze a plurality of extracted functions into a plurality of function graphs for each of the plurality of simulation components, wherein the plurality of extracted functions includes one or more of a plurality of interface-derived functions, a plurality of structural-derived functions, a plurality of equation-derived functions, a plurality of algorithmic-derived functions, a plurality of parameter-derived functions, and a plurality of internal variable-derived functions, and wherein the plurality of function graphs includes one or more of an interface function graph, a structural function graph, an equation function graph, an algorithmic function graph, a parameter function graph, and an internal variable function graph;

compose an extracted functions graph with the plurality of extracted functions of the plurality of function graphs; and store the extracted functions graph of the plurality of extracted functions in a components-to-function database.

9. The data processing system of claim 8, wherein to analyze the plurality of extracted functions into the plurality of function graphs comprises:

perform an interface analysis for each of a plurality of ports in a simulation component to determine the plurality of interface-derived functions in the interface function graph;

perform a structural analysis for each of a plurality of simulation sub-components in the simulation component to determine the plurality of structural-derived functions in the structural function graph;

perform an equation-algorithmic analysis for each of a plurality of equations and a plurality of algorithms in the simulation component to determine the plurality of equation-derived functions in the equation function graph and the plurality of algorithmic-derived functions in the algorithmic function graph;

perform a parameter analysis for each of a plurality of parameters in the simulation component to determine the plurality of parameter-derived functions in the parameter function graph; and perform an internal variable analysis for each of a plurality of internal variables in the simulation component to determine the plurality of internal variable-derived functions in the internal variable function graph.

10. The data processing system of claim 9, wherein to perform the interface analysis comprises:
parse a port type from a port of the simulation component;
store the port type in the accessible memory;
expand a combinatorial space of the port type in the accessible memory;
assign the plurality of interface-derived functions to the combinatorial space; and
append the plurality of interface-derived functions to the interface function graph.

11. The data processing system of claim 9, wherein performing the structural analysis comprises:
extract the plurality of structural-derived functions of a plurality of sub-component port types by performing an interface analysis on the simulation sub-component; and
append the plurality of structural-derived functions to the structural function graph.

12. The data processing system of claim 9, wherein performing the equation-algorithmic analysis comprises:
parse a plurality of equation state variables from an equation and a plurality of algorithmic state variables from an algorithm;
perform a dataflow analysis on the plurality of equation state variables of the plurality of equations to determine the plurality of equation-derived functions and a dataflow analysis on the plurality of algorithmic state variables of the plurality of algorithms to determine the plurality of algorithmic-derived functions; and
append the plurality of equation-derived functions to the equation function graph and the plurality of algorithmic-derived functions to the algorithmic function graph.

13. The data processing system of claim 9, wherein to perform the parameter analysis comprises:
parse a parameter type and a parameter value from a parameter;
extract a plurality of port types from the interface analysis of the simulation component;
extract a plurality of sub-component port types from the structural analysis of the simulation component;
extract a plurality of equation state variables and a plurality of algorithmic state variables from the equation-algorithmic analysis of the simulation component;
determine the plurality of parameter-derived functions based on a relationship of the parameter type and the parameter value with the plurality of port types, the plurality of sub-component port types, the plurality of equation state variables and the plurality of algorithmic state variables; and
append the plurality of parameter-derived functions to the parameter function graph.

14. The data processing system of claim 9, further comprising:
receive a 1D simulation that includes a plurality of simulation components from the simulation component library; and
produce an architecture model based on the extracted functions graph.

15. A non-transitory computer-readable medium encoded with executable instructions that, when executed, cause one or more data processing systems to:
receive a simulation component library comprising a plurality of simulation components into a memory of the one or more data processing system;
parse the plurality of simulation components from the simulation component library;
analyze a plurality of extracted functions into a plurality of function graphs for each of the plurality of simulation components, wherein the plurality of extracted functions includes one or more of a plurality of interface-derived functions, a plurality of structural-derived functions, a plurality of equation-derived functions, a plurality of algorithmic-derived functions, a plurality of parameter-derived functions, and a plurality of internal variable-derived functions, and wherein the plurality of function graphs includes one or more of an interface function graph, a structural function graph, an equation function graph, an algorithmic function graph, a parameter function graph, and an internal variable function graph;
compose an extracted functions graph with the plurality of extracted functions of the plurality of function graphs; and
store the extracted functions graph of the plurality of extracted functions in a components-to-function database.

16. The computer-readable medium of claim 15, wherein to analyze the plurality of extracted functions into the plurality of function graphs comprises:
perform an interface analysis for each of a plurality of ports in a simulation component to determine the plurality of interface-derived functions in the interface function graph;
perform a structural analysis for each of a plurality of simulation sub-components in the simulation component to determine the plurality of structural-derived functions in the structural function graph;
perform an equation-algorithmic analysis for each of a plurality of equations and a plurality of algorithms in the simulation component to determine the plurality of equation-derived functions in the equation function graph and the plurality of algorithmic-derived functions in the algorithmic function graph;
perform a parameter analysis for each of a plurality of parameters in the simulation component to determine the plurality of parameter-derived functions in the parameter function graph; and
perform an internal variable analysis for each of a plurality of internal variables in the simulation component to determine the plurality of internal variable-derived functions in the internal variable function graph.

17. The computer-readable medium of claim 16, wherein to perform the interface analysis comprises:
parse a port type from a port of the simulation component;
store the port type in the memory;
expand a combinatorial space of the port type in the memory;
assign the plurality of interface-derived functions to the combinatorial space; and
append the plurality of interface-derived functions to the interface function graph.

18. The computer-readable medium of claim 16, wherein performing the equation-algorithmic analysis comprises:
parse a plurality of equation state variables from an equation and a plurality of algorithmic state variables from an algorithm;
perform a dataflow analysis on the plurality of equation state variables of the plurality of equations to determine the plurality of equation-derived functions and a dataflow analysis on the plurality of algorithmic state variables of the plurality of algorithms to determine the plurality of algorithmic-derived functions; and append the plurality of equation-derived functions to the equation function graph and the plurality of algorithmic-derived functions to the algorithmic function graph.

19. The computer-readable medium of claim 16, wherein to perform the parameter analysis comprises:
parse a parameter type and a parameter value from a parameter;
extract a plurality of port types from the interface analysis of the simulation component;
extract a plurality of sub-component port types from the structural analysis of the simulation component;
extract a plurality of equation state variables and a plurality of algorithmic state variables from the equation-algorithmic analysis of the simulation component;
determine the plurality of parameter-derived functions based on a relationship of the parameter type and the parameter value with the plurality of port types, the plurality of sub-component port types, the plurality of equation state variables and the plurality of algorithmic state variables; and
append the plurality of parameter-derived functions to the parameter function graph.

20. The computer-readable medium of claim 16, further comprising:
receive a 1D simulation that includes a plurality of simulation components from the simulation component library; and
produce an architecture model based on the extracted functions graph.

* * * * *